United States Patent
Schafer et al.

(10) Patent No.: US 8,844,484 B2
(45) Date of Patent: Sep. 30, 2014

(54) NON-RETURN VALVE OF A CAMSHAFT ADJUSTER

(71) Applicant: Schaeffler Technologies AG & Co. KG, Herzogenaurach (DE)

(72) Inventors: Jens Schafer, Herzogenaurach (DE); Martin Steigerwald, Herzogenaurach (DE); Michael Busse, Herzogenaurach (DE); Jurgen Plate, Gerhardshofen (DE); Andreas Wedel, Emskirchen (DE); Olaf Boese, Nuremberg (DE); Steffen Racklebe, Obermichelbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/742,494

(22) Filed: Jan. 16, 2013

(65) Prior Publication Data
US 2013/0199474 A1    Aug. 8, 2013

(30) Foreign Application Priority Data
Feb. 2, 2012  (DE) .......................... 10 2012 201 550

(51) Int. Cl.
*F01L 1/34*  (2006.01)
*F01L 1/344*  (2006.01)
*F16K 15/02*  (2006.01)

(52) U.S. Cl.
CPC ....... *F01L 1/344* (2013.01); *F01L 2001/34446* (2013.01); *F01L 1/3442* (2013.01); *F16K 15/023* (2013.01); *F16K 15/028* (2013.01)
USPC ..................................... 123/90.17; 123/90.15

(58) Field of Classification Search
USPC ................................ 123/90.15, 90.17, 90.31
See application file for complete search history.

(56) References Cited

U.S. PATENT DOCUMENTS 7,553,409 B2 *   6/2009   Luka et al. .................... 210/136
2012/0111295 A1 *   5/2012   Plate et al. ................. 123/90.15

FOREIGN PATENT DOCUMENTS

WO     2011138136       11/2011

* cited by examiner

*Primary Examiner* — Zelalem Eshete
(74) *Attorney, Agent, or Firm* — Volpe and Koenig, P.C.

(57) ABSTRACT

A camshaft adjuster with a drive element, a driven element, and a pressure chamber formed between the drive element and the driven element for generating a relative rotation between the driven element and the drive element, and a volume accumulator that is arranged in the camshaft adjuster and supplies hydraulic medium via a channel from the volume accumulator to the pressure chamber if there is an underpressure in the pressure chamber. The camshaft adjuster has a non-return valve with a closing part for closing an opening of the channel, the non-return valve allows a flow of hydraulic medium through the channel from the volume accumulator to the pressure chamber, and there is an elastically expandable component that projects into the channel and can be guided by the channel and is connected to the closing part and is provided for applying tension for pulling the closing part into the channel.

3 Claims, 5 Drawing Sheets

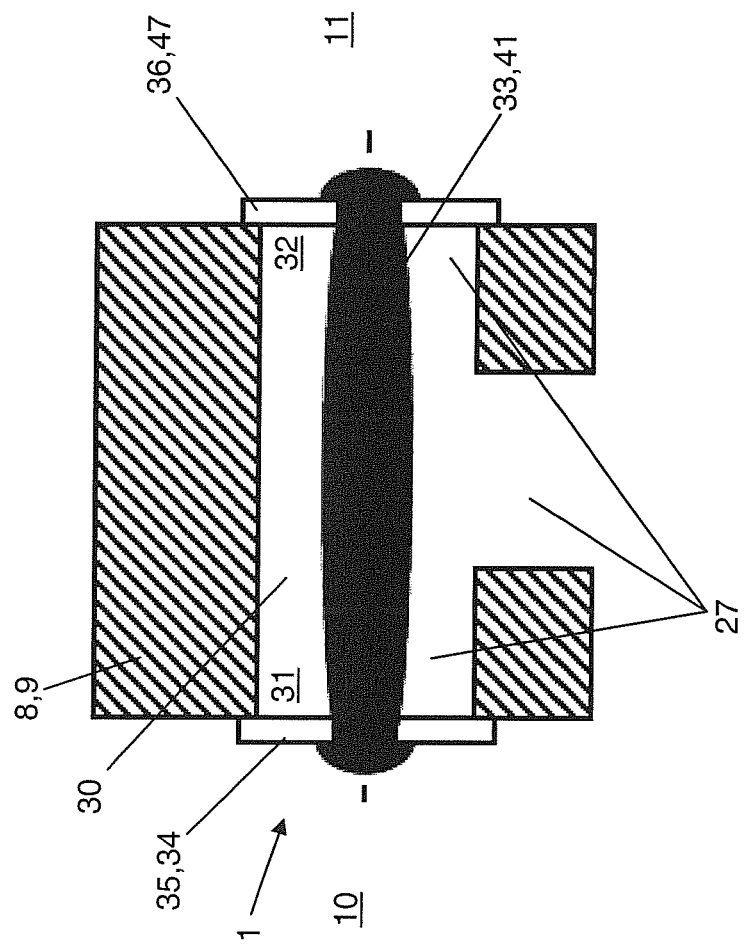

US 8,844,484 B2

NON-RETURN VALVE OF A CAMSHAFT ADJUSTER

INCORPORATION BY REFERENCE

The following documents are incorporated herein by reference as if fully set forth: German Patent Application No.: 10 2012 201 550.7, filed Feb. 2, 2012.

FIELD OF THE INVENTION

The invention relates to a non-return valve of a camshaft adjuster.

BACKGROUND

Camshaft adjusters are used in internal combustion engines for varying the control times of the combustion chamber valves, in order to variably shape the phase relation between a crankshaft and a camshaft in a defined range of angles between a maximum advanced position and a maximum retarded position. Adapting the control times to the current load and rotational speed reduces the consumption and the emissions. For this purpose, camshaft adjusters are integrated into a drive train by which torque is transmitted from the crankshaft to the camshaft. This drive train can be constructed, for example, as a belt drive, chain drive, or gearwheel drive.

In a hydraulic camshaft adjuster, the driven element and the drive element form one or more pairs of pressure chambers that act in opposite directions and can be pressurized with hydraulic medium. The drive element and the driven element are arranged coaxial to each other. By filling and emptying individual pressure chambers, a relative movement is generated between the drive element and the driven element. A spring causes rotation between the drive element and the driven element forces the drive element in a preferred direction relative to the driven element. This preferred direction can be in the same direction as or opposite the direction of rotation.

One structural type of hydraulic camshaft adjuster is the vane cell adjuster. The vane cell adjuster has a stator, a rotor, and a drive wheel with external teeth. The rotor is constructed as the driven element and usually can be locked in rotation with the camshaft. The drive element includes the stator and the drive wheel. The stator and the drive wheel are locked in rotation with each other or are alternatively constructed as one part with each other. The rotor is arranged coaxial to the stator and within the stator. The rotor and the stator form, with their vanes extending in the radial direction, oil chambers that act in opposite directions and can be pressurized by oil pressure and allow a relative rotation between the stator and the rotor. The vanes are formed either integrally with the rotor or the stator or arranged as "inserted vanes" in grooves of the rotor or the stator provided for this purpose. The vane cell adjusters further have various sealing covers. The stator and the sealing cover are secured with each other by means of several screw connections.

Another structural type of hydraulic camshaft adjuster is the axial piston adjuster. Here, a displacement element is shifted in the axial direction via oil pressure, wherein this element generates a relative rotation between a drive element and a driven element through the use of helical teeth.

From WO 2011 138 136 A1 it is known to arrange a volume accumulator in a camshaft adjuster, wherein, in the case of an under-pressure in the pressure chambers, hydraulic fluid can be drawn from the volume accumulator into the pressure chambers. For realizing this function, the camshaft adjuster has several non-return valves that have a U-shaped construction and allow a flow of hydraulic medium from the volume accumulator inside the camshaft adjuster to the pressure chambers.

SUMMARY

The objective of the invention is to provide a camshaft adjuster with an improved non-return valve, wherein the non-return valve can be inserted into a very limited installation space.

This objective is met according to one or more features of the invention.

The invention discloses a camshaft adjuster for an internal combustion engine that has a drive element, a driven element, and a pressure chamber formed between the drive element and the driven element for generating a relative rotation between the driven element and the drive element, and also a volume accumulator that is arranged in the camshaft adjuster, in particular, in the drive element and/or in the driven element and/or in a side cover, and supplies hydraulic medium via a channel from the volume accumulator to the pressure chamber if there is an under-pressure in the pressure chamber.

According to the invention, the camshaft adjuster has at least one non-return valve according to the invention that seals the channel and is formed in the described constructions with at least one closing part and/or at least one elastically expandable component that is advantageously provided on a vane of the drive element and/or the driven element.

The invention provides moving the fastening of the non-return valve into the channel between the pressure chamber and the volume accumulator, so that there are no longer external fastening means and thus they also no longer take up installation space. Advantageously, the adjustment range of the camshaft adjuster can be increased.

The invention thus provides a non-return valve with a closing part for blocking an opening of a channel of a camshaft adjuster, wherein the non-return valve allows a flow of hydraulic medium through the channel from a volume accumulator arranged in the camshaft adjuster to a pressure chamber of the camshaft adjuster. The non-return valve according to the invention has an elastically expandable component that projects into the channel and can be guided through the channel and is connected to the closing part and is provided for pulling the closing part into the channel.

The pressure chamber of the camshaft adjuster generates a relative rotation between the drive element and the driven element of the camshaft adjuster in one direction. As is known from the prior art, the camshaft adjuster has another pressure chamber that acts in the direction opposite the first pressure chamber and generates a relative rotation in the opposite direction. The non-return valve opens when there is an under-pressure in the pressure chamber connected to the channel, wherein this under-pressure is less than the pressure in the pressure chamber acting in the opposite direction and/or is less than the pressure in the volume accumulator. The under-pressure is generated, for example, by a changing moment of the camshaft that is directed opposite the desired adjustment direction.

The closing part can have any shape, for example, a plate, a ball, or a cone. The elastically expandable component can be a spring element. It could be made from steel, rubber, or another elastic material, as long as a sufficient spring path is provided so that the non-return valve opens and thus provides a through-flow cross section through which sufficient hydraulic medium can flow from the volume accumulator through the channel into the pressure chamber.

The elastically expandable component positions the non-return valve with the closing part in its function as a fastening element reliably on the opening or on the mouth of the channel to the pressure chamber. Due to the elasticity of the elastically expandable component, the closing part of the non-return valve is advantageously held on the opening with a biasing force. A special feature of the elastically expandable component according to the invention is provided in that this component is mainly loaded in tension, i.e., in contrast to a compression spring, the spring force of the elastically expandable component increases for simultaneous increase in the spring length. Thus, the spring force increases when the closing part of the non-return valve moves out of contact with the opening and opens a through-flow cross section. The monotonously increasing behavior of the spring rate of the elastically expandable component can have a linear or non-linear profile.

The closing part of the non-return valve is further guided by the elastically expandable component in which the elastically expandable component is arranged in the channel itself. Thus, a reliable reproduction of the opening and closing motion of the non-return valve and also a unique positioning of the closing part relative to the opening is given.

In one refinement of the invention, the non-return valve according to the invention comprises another closing part for blocking another opening of the channel, wherein, for example, the other opening leads to another pressure chamber. Here, the elastically expandable component is connected to the closing part and also to the additional closing part and is provided between the two openings of the channel for pulling together the two closing parts. The biasing force of the elastically expandable component is oriented in the closing direction of the non-return valve or the closing parts and moves both closing parts toward each other. In this way, the non-return valve is held in the channel without extra holding means being necessary for the elastically expandable component for holding it on the driven element or the drive element. The non-return valve or its closing parts are guided in the channel by the elastically expandable component.

In one special refinement of the invention, the closing part is a plate with a chamfer corresponding to the opening. The chamfer of the plate corresponds to a chamfer of the opening. The chamfer always provides a centering of the plate relative to the opening. The plate itself can have an advantageously rotationally symmetric construction. Alternatively, polygonal shapes of the plate are conceivable.

The invention also provides a driven element of a camshaft adjuster that comprises a hub and at least one vane projecting from the hub in the radial direction with a channel that provides a fluid connection for a volume accumulator in the camshaft adjuster to a pressure chamber of the camshaft adjuster. According to the invention, in this channel the elastically expandable component of the disclosed non-return valve is guided. The elastically expandable component can be here installed in or on the channel. Alternatively, it could also be guided and mounted in the volume accumulator. Also alternatively it could be mounted as described above on another closing part, wherein the channel of the driven element has two openings accordingly that are closed by the two closing parts accordingly.

The invention also provides a drive element of a camshaft adjuster that comprises a ring-shaped outer part and at least one vane-shaped segment projecting inward in the radial direction from the ring-shaped outer part, wherein the channel provides a fluid connection for a volume accumulator arranged in the camshaft adjuster to a pressure chamber of the camshaft adjuster. According to the invention, the elastically expandable component of the non-return valve according to the invention can be guided in this channel. The elastically expandable component can here be mounted in or on the channel. Alternatively, it could also be guided and mounted in the volume accumulator. Also alternatively it could be mounted as described above on another closing part, wherein the channel of the drive element has two openings that are closed by the two closing parts accordingly.

BRIEF DESCRIPTION OF THE DRAWINGS

Embodiments of the invention are shown in the figures. Shown are:

FIG. 5 is a view of a second embodiment of the non-return valve from FIGS. 2 and 3.

DETAILED DESCRIPTION OF THE PREFERRED EMBODIMENTS

Figure 1:
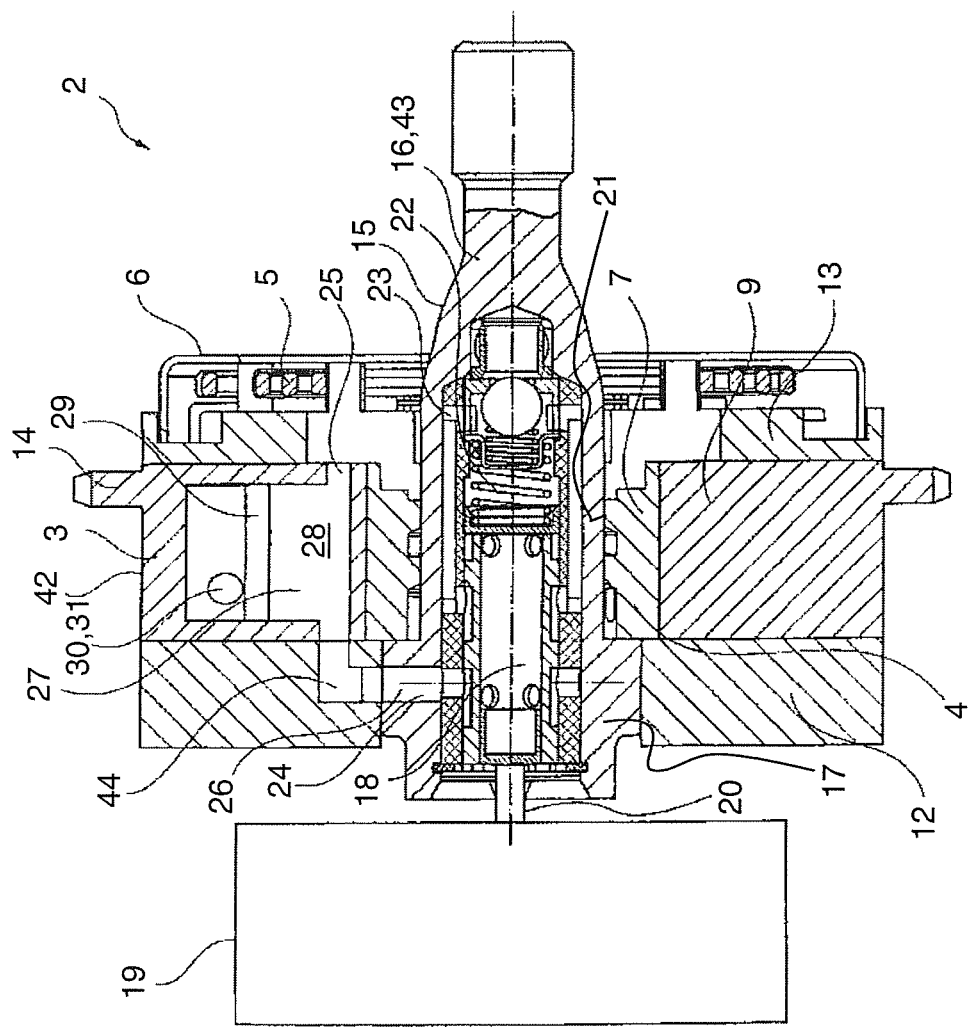
FIG. 1 is a section view of a camshaft adjuster.

FIG. 1 shows a section view of a camshaft adjuster 2.

The camshaft adjuster 2 has a drive element 3, a driven element 4, a rotary spring 5, a spring cover 6, and two side covers 12, 13. FIG. 1 further shows a central valve 15 that is held centrally in the camshaft adjuster 2 and is actuated by a central magnet 19.

The driven element 4 is held concentrically by the drive element 3 and has vanes 8 projecting in the radial direction from the hub 7 of the driven element 4. The drive element 3 likewise has radial vanes 9, as can be seen well in FIGS. 2 and 3.

The vanes 9 of the drive element 3 and the vanes 8 of the driven element 4 partition pressure chambers 10, 11 that act in opposite directions and generate, in a known way, the relative rotation between the drive element 3 and the driven element 4. The rotary spring 5 is supported on the drive element 3 and on the driven element 4 and generates a torque between the drive element 3 and the driven element 4 in one rotational direction. The side covers 12, 13 are each arranged laterally relative to the drive element 3. The drive element 3 has, on the outer periphery 42, teeth 14 that can be engaged with a control drive that is not shown in more detail.

A central valve 15 is arranged concentric to the camshaft adjuster 2. By the use of this configuration of the central valve 15, the camshaft adjuster 2 can be mounted in a known way on a camshaft that is not shown in more detail. The outer housing 43 of the central valve 15 is constructed as a central screw 16 and can clamp the driven element 4 with the camshaft in a rotationally locked way. Through the use of an actuation pin 20, the central magnet 19 positioned coaxial to this arrangement controls the position of the control piston 18 arranged within the central valve 15 against the spring force of a compression spring 22. The control piston 18 distributes the hydraulic medium that is fed by a supply channel 23 to the pressure chambers 10, 11 and possibly to a not-shown mechanical locking mechanism.

Below, special features in terms of the invention will be discussed.

The central valve 15 has a volume accumulator connection 24 that is constructed as a radial hole 26. The radial hole 26 is arranged in the screw head 17 of the central screw 16. The side cover 12 arranged on the side of the camshaft adjuster 2 facing the central magnet 19 has a volume accumulator channel 44 that leads hydraulic medium from the volume accumulator connection 24 of the central valve 15 to the volume accumulator 29 of the camshaft adjuster 2. The volume accumulator 29 is here constructed by the drive element 3 as a cavity in a vane 9 of the drive element 3.

The volume accumulator 29 has an opening 31 to the adjacent pressure space 10 of the camshaft adjuster 2, wherein the flow of hydraulic medium is allowed in one direction through this opening 31 by a non-return valve 1 and is blocked in the opposite direction. In terms of the invention, the non-return valve 1 allows the flow of hydraulic medium into the pressure chamber 10, so that the pressure space 10 can draw the hydraulic medium stored in the cavity 28 in the case of an under-pressure. If too much hydraulic medium is fed to the volume accumulator 29, then the excess of hydraulic medium is discharged via a tank connection 25, for example, to a not-shown tank. The cavity 28 in the vane 9 is therefore used as a volume accumulator 29 for equalizing an under-pressure in the corresponding adjacent pressure chamber 10 of the camshaft adjuster 2.

Figure 2:
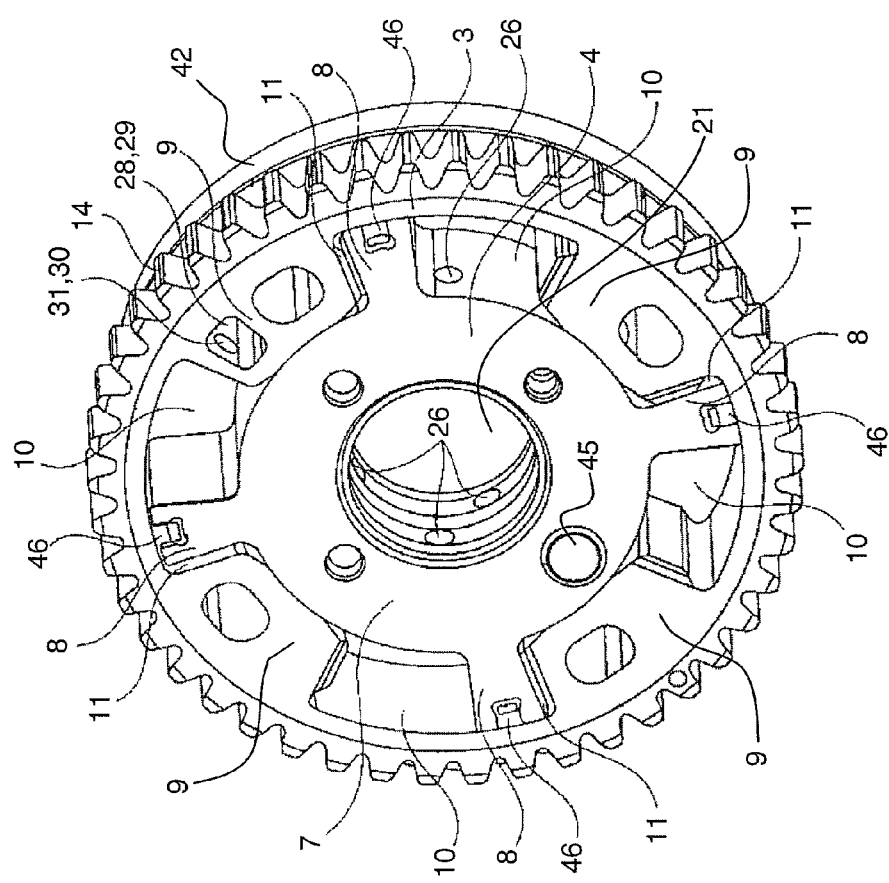
FIG. 2 is a three-dimensional illustration of a drive element from FIG. 1.
Figure 3:
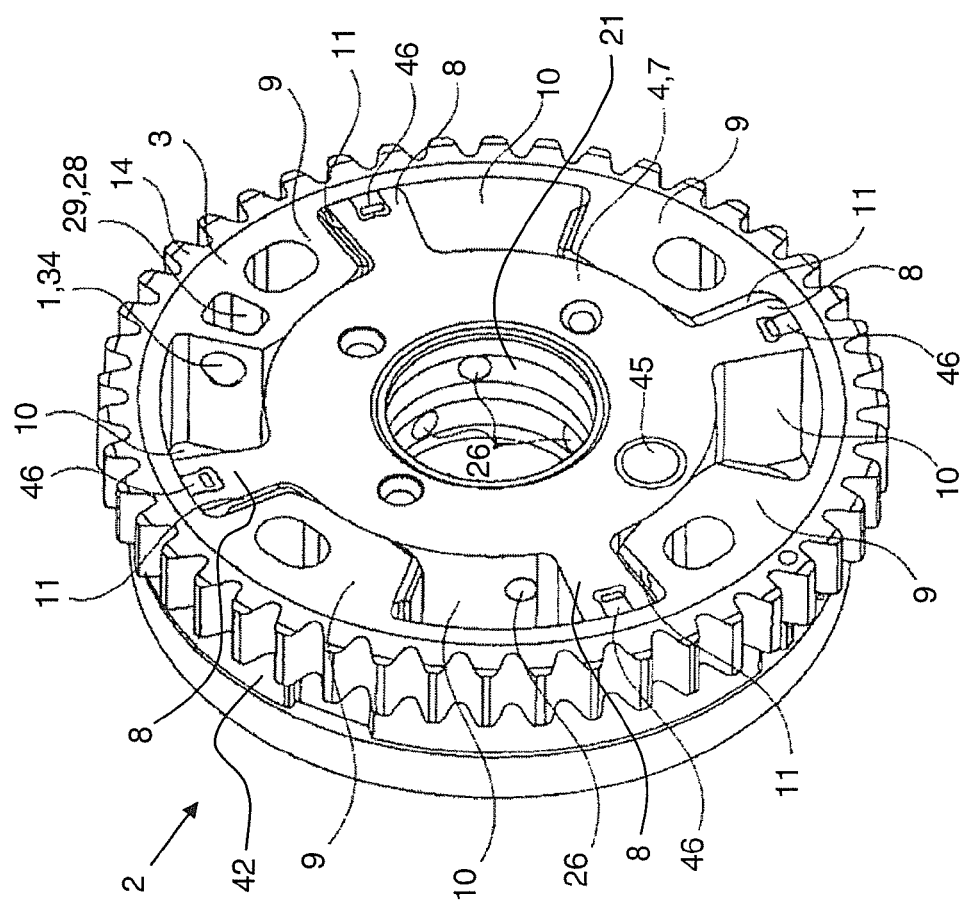
FIG. 3 is a three-dimensional illustration of the drive element from FIG. 2 from a different perspective.

FIGS. 2 and 3 show the camshaft adjuster 2 from two different perspectives.

The driven element 3 has a coaxial central opening 21 in which the central valve 15 can be inserted. Radial holes 26 extend from the central opening 21. These holes communicate with the work connections of the central valve 15, in order to fill or empty the pressure chambers 10, 11 with hydraulic medium. The driven element 4 further comprises an axial blind hole 45 in which a not-shown locking pin for locking the driven element 4 can be held opposite the drive element 3. The radial ends of the vanes 8 of the driven element 4 each have a seal 46 for sealing the adjacent pressure chambers 10, 11.

In the present embodiment, only one of the pressure chambers 10 or 11 is connected to a cavity 28 formed as a volume accumulator 29 for equalizing pressure via a non-return valve 1. However, all of the pressure chambers 10 or 11 that act in the same peripheral direction could be connected to a respective cavity 28 arranged in the vanes 9 of the drive element 3 via non-return valves 1 for equalizing the pressure.

In FIGS. 2 and 3, the opening 31 is constructed as a hole 30 in the peripheral direction of the drive element 3 from the cavity 28 into the corresponding adjacent pressure chamber 10. This hole connects the cavity 28 to the pressure chamber 10. On the side of the pressure chamber, the non-return valve 1 is arranged in the form of a small plate 35, 36 on the vane 9 of the drive element 3. This plate presses on the vane 9 of the drive element 3 and thus closes the opening 31. In the present construction, the pressure chamber 10 is connected to the cavity 28 via a single hole 30. However, several openings 31 to one pressure chamber 10 or to two adjacent pressure chambers 10, 11 could also be arranged on the respective vane 9 of the drive element 3, wherein the openings 31 are provided with non-return valves 1. It is also possible to arrange several non-return valves 1 in series and/or in parallel in a single opening 31.

In FIGS. 2 and 3, the cavity 28 formed as a volume accumulator 29 is constructed, as an example, in the drive element 3. The volume accumulator 29, however, could be formed at any position in the camshaft adjuster 2. For example, the cavity 28 could be formed, as shown below, in the driven element 4 or also, if one vane 8 of the driven element 4 is left out between two vanes 9 of the drive element 3, between these two vanes 9 of the drive element 3.

Figure 4:
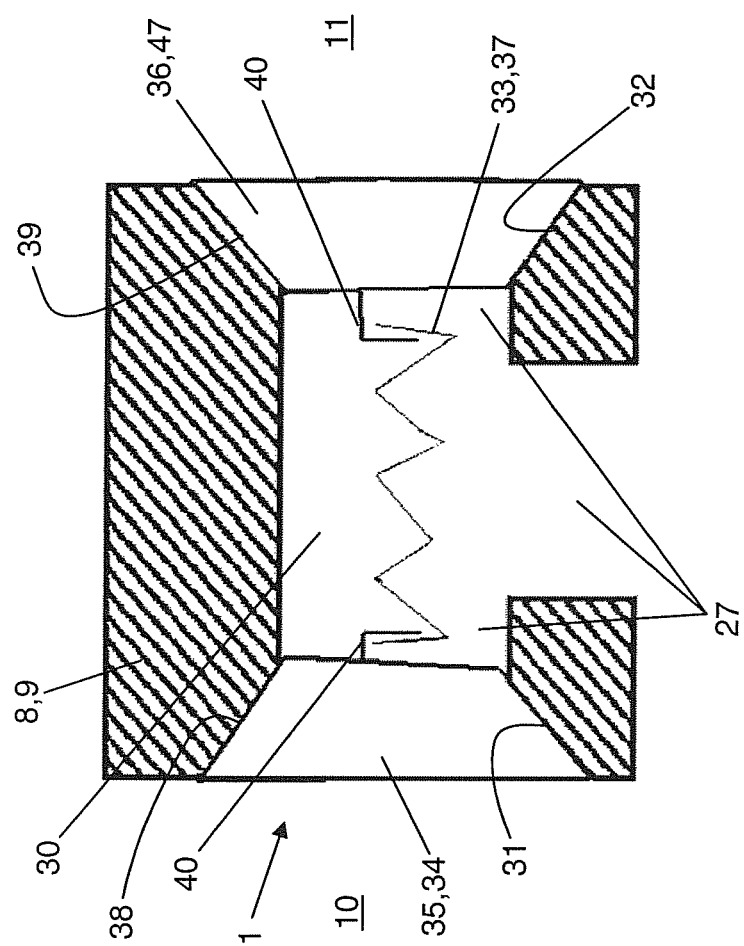
FIG. 4 is a view of a first embodiment of the non-return valve from FIGS. 2 and 3.

FIG. 4 shows a first embodiment of the non-return valve 1 from FIGS. 2 and 3. The vane 9 is completely passed through by a hole 30 that branches, as part of the channel 27, from the channel 27 in the peripheral direction or forming a secant. The non-return valve 1 is held in the hole 30. The shown vane 9 could also be formed as a vane 8 of the driven element 4.

As closing parts 34, 37, the non-return valve 1 has plates 35, 36 in a conical form that are connected to each other by a spring 37 on their faces turned toward each other. The spring 37 is arranged in the channel 27 or in the hole 30 and held on hooks 40 of the plates 35, 36. The spring 37 pulls both plates together, wherein the channel 27 is closed. The two plates 35, 36 lie in respective openings 31, 32 of the channel 27 or the hole 30 to the pressure chamber 10 or 11, respectively, and close the corresponding opening 31, 32.

This embodiment of the non-return valve 1 can be installed with the help of a two-part drive element 3. The non-return valve 1 is placed in one receptacle of one half of the drive element 3. Then the receptacle is closed by the other half of the drive element 3. When both halves are connected, the receptacle can then form the channel 27 or the hole 30 and also the openings 31, 32 to at least one pressure chamber 10, 11.

It is also conceivable to insert the non-return valve 1 in the axial direction in a receptacle of the drive element 3 that is closed by a side cover 12 or 13. As an alternative, the installation in the radial direction is also conceivable starting from the free end of one vane 8 or 9, depending on which vane 8 or 9 the non-return valve 1 is arranged. The receptacle can be shaped so that the openings 31, 32, hole 30, and/or channel 27 are inherently formed. However, in each embodiment, the closing part 34 of the non-return valve 1 must cover the opening 31 or 32, wherein the elastically expandable component 33 of the non-return valve 1 is arranged in the channel 27 or the hole 30.

A chamfer 38, 39 formed by the conical shape on the plates 35, 36 forms a flush contact on a corresponding chamfer on the opening 31, 32 of the hole 30. Through the chamfers 38, 39, a centered orientation of the plates 35, 36 in the openings 31, 32 of the hole 30 is always given, so that the channel 27 to the volume accumulator 29 remains reliably closed when there is an over-pressure or normal pressure in the pressure chamber 10 or 11.

FIG. 5 shows a second embodiment of the non-return valve 1 from FIGS. 2 and 3. The vane 9 is passed through by a hole 30 that branches, as part of the channel 27, from the channel 27 in the peripheral direction or forming a secant. The non-return valve 1 is held in the receptacle 30. The shown vane 9 could also be formed as a vane 8 of the driven element 4.

In FIG. 5, the plates 35, 36 are constructed without chamfers and also do not have a conical shape. The plates 35, 36 formed here as disks cover the openings 31, 32. They are further connected to each other by an elastically expandable component 33, here constructed as a rubber band 41.

Installation can be performed analogous to the construction explained with FIG. 4.

LIST OF REFERENCE NUMBERS

1) Non-return valve
2) Camshaft adjuster
3) Drive element
4) Driven element
5) Rotary spring
6) Spring cover 7) Hub
8) Vane
9) Vane
10) Pressure chamber
11) Pressure chamber
12) Side cover
13) Side cover
14) Teeth
15) Central valve
16) Central screw
17) Screw head
18) Control piston
19) Central magnet
20) Actuation pin
21) Central opening
22) Pressure spring
23) Supply connection
24) Volume accumulator connection
25) Tank connection
26) Radial hole
27) Channel
28) Cavity
29) Volume accumulator
30) Hole
31) Opening
32) Opening
33) Elastically expandable component
34) Closing part
35) Plate
36) Plate
37) Spring
38) Chamfer
39) Chamfer
40) Hook
41) Rubber band
42) Outer periphery
43) Outer housing
44) Volume accumulator channel
45) Axial blind hole
46) Seal
47) Closing part

The invention claimed is:

1. A camshaft adjuster comprising a drive element, a driven element, and a pressure chamber formed between the drive element and the driven element for generating a relative rotation between the driven element and the drive element, a volume accumulator that is arranged in the camshaft adjuster and supplies hydraulic medium via a channel from the volume accumulator to the pressure chamber for an under-pressure in the pressure chamber, a non-return valve with a closing part for closing an opening of the channel, the non-return valve allows a flow of hydraulic medium through the channel from the volume accumulator to the pressure chamber, and an elastically expandable component that projects into the channel and is guided by the channel is connected to the closing part and applies tension for pulling the closing part into the channel.

2. The camshaft adjuster with the non-return valve according to claim 1, wherein the closing part is a plate with a chamfer corresponding to the opening.

3. A camshaft adjuster comprising a drive element, a driven element, and a pressure chamber formed between the drive element and the driven element for generating a relative rotation between the driven element and the drive element, a volume accumulator that is arranged in the camshaft adjuster and supplies hydraulic medium via a channel from the volume accumulator to the pressure chamber for an under-pressure in the pressure chamber, a non-return valve with a closing part for closing an opening of the channel, the non-return valve allows a flow of hydraulic medium through the channel from the volume accumulator to the pressure chamber, and an elastically expandable component that projects into the channel and is guided by the channel is connected to the closing part and applies tension for pulling the closing part into the channel, and a second closing part for blocking a second opening of the channel, the elastically expandable component is connected to the second closing part and the elastically expandable component is provided between the two openings of the channel for applying tension to the closing parts.

* * * * *